United States Patent [19]

Shaffer

[11] Patent Number: 5,059,159

[45] Date of Patent: Oct. 22, 1991

[54] WAVE GEAR LINEAR DRIVE

[75] Inventor: James E. Shaffer, Maitland, Fla.

[73] Assignee: Consulier Industries, Inc., Riviera Beach, Fla.

[21] Appl. No.: 483,929

[22] Filed: Feb. 23, 1990

Related U.S. Application Data

[63] Continuation-in-part of Ser. No. 458,149, Dec. 28, 1989.

[51] Int. Cl.[5] .............................................. F16H 13/04

[52] U.S. Cl. ..................................... 475/168; 74/89.2; 74/110; 475/182; 475/183

[58] Field of Search ................. 74/110, 89.2; 475/168, 475/167, 165, 182, 183

[56] References Cited

U.S. PATENT DOCUMENTS

| | | | |
|---|---|---|---|
| 1,706,180 | 3/1929 | Morison | 475/168 |
| 3,468,175 | 9/1969 | Rabek | 74/110 X |
| 3,472,097 | 10/1969 | Huska | 475/168 X |
| 3,507,159 | 4/1970 | Batty | 74/63 |
| 4,713,985 | 12/1987 | Ando | 475/168 |
| 4,856,378 | 8/1989 | Hvolka | 475/168 |

*Primary Examiner*—Dirk Wright
*Attorney, Agent, or Firm*—Warren L. Franz

[57] ABSTRACT

A linear wave gear drive has a car with oppsoite walls on which pluralities of apertures carrying reciprocating roller assemblies are arrayed. The car is located between inwardly-facing cam surfaces on a track and a belt housing outwardly-facing cam surfaces is passed through the car, with the assemblies contacting facing ones of the surfaces to move the car linearly in response to lineal movement through the car of the belt. The assemblies preferably have three rollers contrally mounted in axially-spaced locations for free, independent rotation about common shaft pins. The apertures are shaped to accommodate the pins in orientations perpendicular to the directions of movement of the belt and car, and parallel to the apertured car sides. Upper and lower rollers have identical larger diameters than central rollers to capture the belt edge in order to inhibit axial displacement of the pins. Assemblies are eliminated from a usual "one more" or "one less" wave gear construction to provide a stronger car.

20 Claims, 2 Drawing Sheets

WAVE GEAR LINEAR DRIVE

CROSS-REFERENCE TO RELATED APPLICATIONS

This application is a continuation-in-part of commonly-owned, copending U.S. Pat. application Ser. No. 07/458,149, filed Dec. 28, 1989, entitled Drive with Oscillator-Coupled Transversely Moving Gear Elements and includes subject matter related to the subject matter of commonly-owned, U.S. Pat. application Ser. Nos. 07/484,115 (entitled Winch Apparatus) now U.S. Pat. No. 5,018,708 and 07/484,064, (entitled Roller Chain Wave Gear Drive), now allowed filed on even date herewith.

BACKGROUND OF THE INVENTION

This invention relates to linear drives, in general; and, in particular, to a linear drive mechanism employing wave gear technology and an improved oscillating roller assembly to provide motion transfer at non-unity ratio between drive and driven members.

Conventional wave gear drive mechanisms of the type to which the invention relates are illustrated in Rabek U.S. Pat. No. 3,468,175 and Batty U.S. Pat. No. 3,507,159. Such mechanisms produce a non-unity motion transfer between a drive member and a driven member due to cycling, elliptical wave motion induced by a cyclically undulated cam surface on a plurality of oscillators in the form, e.g., of roller elements, placed in between and in simultaneous contact with the cam surface and with an oppositely facing cyclically undulated epicycloidal wave surface or cam track formed by alternating teeth and pocket-shaped recesses. In known arrangements, the number of teeth (or recesses) along a certain length of the cam track is one more or one less than the number of oscillators in an equivalent length along an oscillator carrier. As the cam surface is moved, its cyclic undulations cause each oscillator in turn to be moved in and out of the pockets of the opposing multi-toothed cam track surface, thereby inducing a traveling wave-like reciprocation perpendicular to the cam and cam track surfaces in the series of roller elements. Such reciprocation is used to either drive the member on which the cam track is located or drive an intermediate carrier member on which the roller elements are captured.

In a known rectilinear wave gear motion transmission arrangement, shown in Rabek, a first plate cam member of any desirable length is formed with a periodically or cyclically undulated sinusoidal wave surface having alternating points of maximum and minimum amplitude. A second plate cam member, coplanar with the first plate, has a second cyclically undulated sinusoidal surface of different period to the first surface, located in spaced opposition to the first wave surface across a gap. Mounted between the two cam members is an elongated oscillator carrier member having a plurality of holes formed therein at equal intervals, and oriented laterally of the gap, perpendicular to the undulated surfaces (i.e. oriented perpendicular to lines joining the respective maximum or minimum amplitude points of the first or second undulated surfaces). Oscillators, in the form of elongated members having roller elements located at opposite ends thereof, are respectively slidably received in longitudinal alignment within the holes, one of the roller elements located to bear against the first undulated surface and the other located to simultaneously bear against the second undulated surface. One of the three members (first plate, second plate or carrier) functions as an input or drive member, and either of the remaining members functions as an output or driven member. As the drive member is moved linearly in a direction, the oscillators undergo harmonic reciprocation perpendicular to that direction in response to contact with the facing surfaces, to cause the driven member to be moved in a direction (same or opposite) to the drive direction. The direction of driven movement and the linear velocity transfer ratios being determined by the choice of drive and driven members, the number of teeth, and whether the number of oscillators is one more or one less than the number of teeth.

Rabek also discloses oscillators in the form of elongated roller assemblies oriented perpendicular to the drive/driven directions, as well as to the direction of reciprocation, though not in connection with linear drive mechanisms. A concentric wave gear drive, shown in FIGS. 8 and 9 of Rabek, has oscillating assemblies comprising five laterally spaced, independently rotatable rollers coaxially mounted on common pins which are confined in perpendicular orientation within radially directed channels of an output member rotatable about a common axis with a drive member. The roller element pins are disposed in parallel coincident with the axes of rotation of the drive and driven members. The dimensioning of the rollers is such that the second and fourth rollers ride on identical outwardly-facing cam surfaces axially spaced across a gap, while the central, third rollers ride on an inwardly-facing multi-toothed cam surface oppositely-disposed from the gap. There is no disclosure in Rabek to employ such roller assemblies in the linear drives described by Rabek. There is also no disclosure that the rollers which ride on the dual outwardly-facing undulated surfaces can be of a different diameter than the roller which rides on the inwardly-facing undulated surface; nor that the holes of the carrier be of varying cross-sectional dimension running axially of the assemblies; nor any recognition that wave gear drives can be implemented eliminating some of the oscillators/apertures from the carrier.

Batty, in FIGS. 8-10, shows a linear wave gear drive arrangement wherein oppositely-facing cam surfaces are mechanically coupled by means of carrier-contained oscillators in the form of cylindrical rollers oriented axially perpendicular to the direction of drive or driven motion, and also perpendicular to the direction of reciprocation. The carrier holes are, however, not so oriented. The rollers have reduced diameter ends respectively mounted in opposing slots which are each aligned with the direction of reciprocation. There is no disclosure in Batty of utilizing oscillators having multiple rollers freely independently rotatable about common pin shafts, nor of mounting roller oscillators in carrier holes that are aligned with the pin axes and perpendicular to the direction of the reciprocation. Moreover, neither Rabek nor Batty discloses a linear wave gear drive employed to propel an oscillator carrier linearly down a track having opposing first cam surfaces by drawing a flexible belt having opposing second cam surfaces through the car.

SUMMARY OF THE INVENTION

It is an object of the present invention to provide an improved drive mechanism employing wave gear technology which utilizes multiple, axially-aligned rollers, freely independently rotatable about common shaft pin axes in alignment with carrier apertures, to bring about motion transfer between drive and driven elements at a non-unity velocity transfer ratio.

It is a further object of the invention to provide a linear gear drive arrangement for transferring motion between a driven one of a pair of oppositely-facing cyclically undulated cam surfaces and an intermediately positioned carrier member capturing a plurality of oscillating members in apertures oriented transversely to directions of drive and reciprocation movements.

It is a further object of the present invention to provide a linear drive for a car mounted for travel on a stator track member or rack in response to drawing a linear belt member therethrough.

As described in greater detail below with reference to preferred embodiments thereof, a drive mechanism in accordance with the invention has relatively movable oppositely-disposed, facing cyclically undulated cam or wave gear surfaces simultaneously contacted by a plurality of oscillating members captured for reciprocal movement within evenly-spaced apertures of an intermediate carrier member. The oscillating members take the form of roller assemblies comprising pluralities of rollers mounted for independent free rotation in axially-spaced positions about common shaft pins which are located with pin axes at right angles to both the direction of relative movement of the cam surfaces and the direction of reciprocation. The rollers are advantageously placed so that one roller contacts one of the undulated surfaces and another roller contacts the other of the undulated surfaces.

In a preferred linear drive configuration, the carrier member comprises a hollow housing in the form of a rectangular car member positioned for linear movement along a track having dual inwardly-facing cam surfaces, spaced across a gap within which the car rides. Another cam member in the form of a lineal belt which is drawn through the interior of the car has dual outwardly-facing cam surfaces. A plurality of roller assemblies is respectively mounted within a plurality of apertures on opposite sides of the car positioned with their axes in the planes of the car sides. The roller assemblies are reciprocated laterally of the car as the belt is moved, causing them to interact with the inwardly-facing surfaces to drive the car in a linear motion along the track.

The roller assemblies advantageously comprise three rollers, outside ones of which are disposed to respectively ride on the dual inwardly-facing track cam surfaces, and central ones of which are disposed to respectively ride on the outwardly facing belt cam surfaces. The rollers may advantageously be of different diameters, so that the belt is sandwiched between the outer rollers to inhibit displacement of the roller assemblies in the direction of the pin axes.

BRIEF DESCRIPTION OF THE DRAWINGS

Embodiments of the invention have been chosen for purposes of description and illustration, and are shown in the accompany drawings, wherein.

Throughout the drawings, like elements are referred to by like numerals.

DETAILED DESCRIPTION OF THE PREFERRED EMBODIMENT

Figure 1:
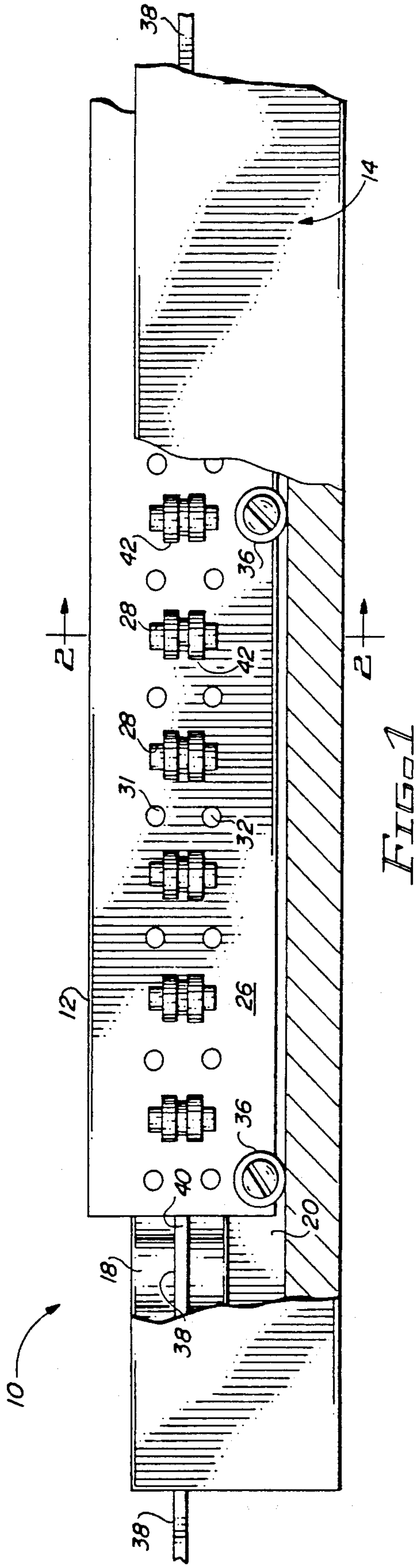
FIG. 1 is a cutaway side view of a linear drive mechanism in accordance with the invention.
Figure 4:
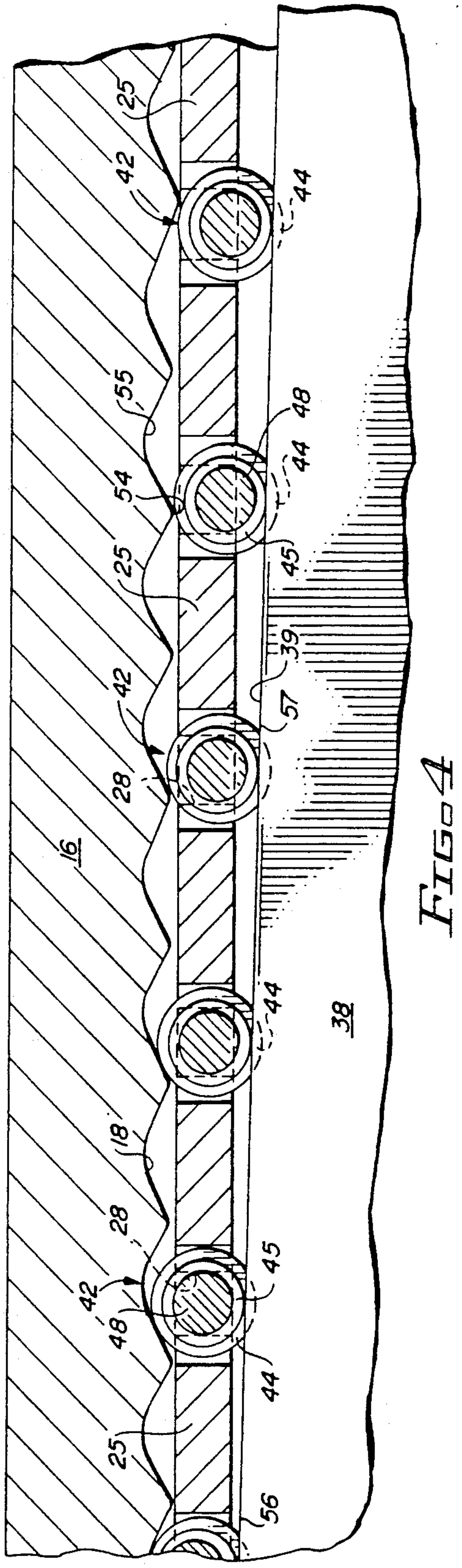
FIG. 4 is a schematic view helpful in understanding the operation of drive in FIGS. 1—3.
Figure 2:
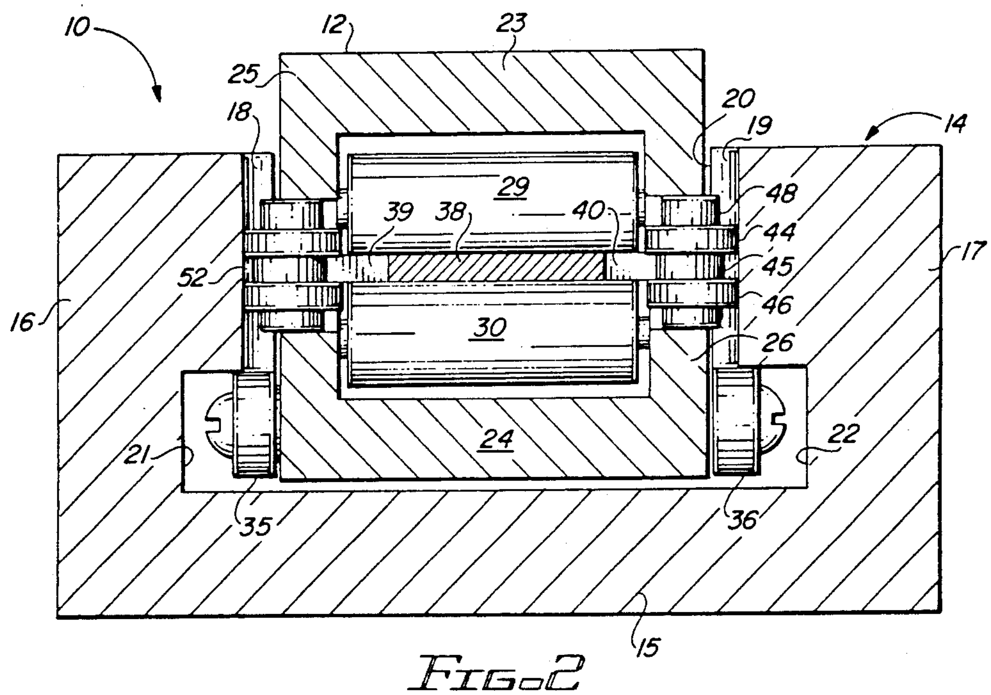
FIG. 2 is a section view taken along the line 2—2 of FIG. 1.
Figure 3:
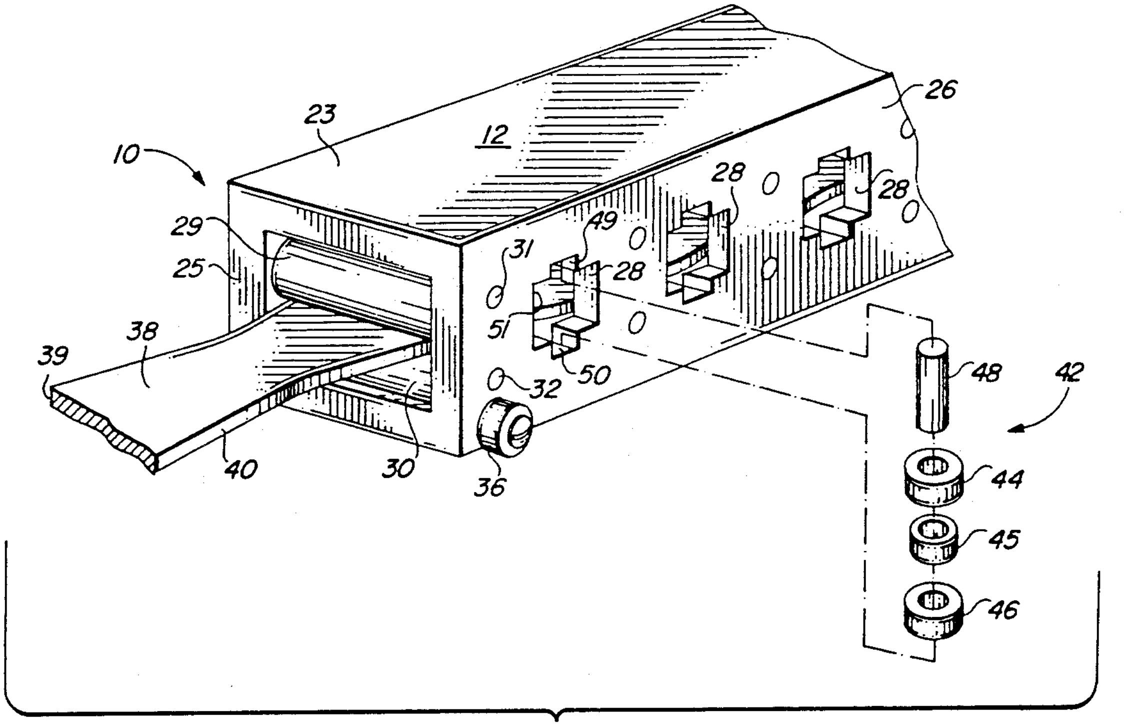
FIG. 3 is an exploded, fragmentary perspective view of the car of FIGS. 1 and 2.

Principles of the invention are illustrated, by way of example, embodied in a linear drive mechanism 10 illustrated in FIGS. 1—3 and motive operation of which can be understood with reference to the schematic representation shown in FIG. 4.

The shown drive mechanism 10 comprises a car 12 of predefined length mounted for lineal movement on a continuous track or rail 14. The track 14 has a general U-shaped lateral cross-section including a horizontal base portion 15 (FIG. 2) and left and right upwardly and inwardly extending side or flange portions 16, 17. The flange portions 16, 17 are respectively accommodated with dual inwardly-facing mirror-image cam surfaces 18, 19, oppositely disposed across a open-topped gap 20 within which the car 12 is fitted. The gap 20 is widened in the lower region adjacent side portions 16, 17 to provide left and right guide channels 21, 22 (FIG. 2).

The car 12 has hollow shell, rectangular lateral cross-ssectional configuration (FIG. 2) including upper and lower planar horizontal spaced wall sections 23, 24 and left and right vertical spaced wall sections 25, 26. The wall sections 25, 26 are formed with a plurality of evenly-spaced elongated holes or apertures 28 oriented with their elongations aligned vertically, and having reduced dimension longitudinally of the car at their upper and lower ends to give a general cookie dough rolling pin cross-sectional configuration in the plane of the walls 25, 26. A plurality of pairs of horizontally disposed rollers 29, 30 (FIGS. 2 and 3) are disposed between the apertures 28, journalled at opposite ends respectively to the walls 25, 26 for rotation about shafts 31, 32 (FIGS. 1 and 3) extending perpendicular at vertically spaced positions to the walls 25, 26.

At periodic intervals along the length of car 12, left and right roller pairs 35, 36 (FIG. 2) are positioned externally of and journalled for rotation on the base 24 to extend respectively into the guide channels 21, 22 for rotation about horizontal axes.

A continuous flat lineal member or belt 38 is extended through the hollow interior of the car 12 between the rollers 29, 30. The belt 38 has left and right side edges 39, 40 respectively cyclically undulated in a horizontal plane to present dual mirror-imaged outwardly facing cam surfaces. The surfaces 39, 40 of belt 38 are relatively located to respectively oppose central portions of the inwardly-facing surfaces 18, 19 (FIG. 2) when the car 12 is in place on the track 14 and the belt 38 is drawn between rollers paths 29, 30 through the interior of the car 12. The belt 38 may be a flexible continuous metal belt or be of chained or segmented hinged plate or other construction. The pairs of horizontal rollers 29, 30 function to support the sides of the belt 38 within the car 12 and to keep the belt 38 from buckling.

Oscillating elements in the form of roller assemblies 42 (FIG. 1) are respectively situated in captured positions within the apertures 28 of the car 12, in simultaneous contact with facing ones of the surfaces 18, 19, 39, 40. The apertures confine the assemblies 42 against vertical movement and horizontal movement longitudinally of the car 12. The assemblies 42 are, however, given freedom of movement within the limits of the facing surfaces 18, 19, 39, 40 in the horizontal direction laterally of the car 12.

As shown in FIGS. 2 and 3, each assembly 42 comprises three cylindrical rollers 44, 45, 46 mounted for independent free rotation in axially-spaced positions about a common shaft pin 48. The assemblies 42 are located in the apertures 28 with the pins 48 axially aligned with the vertical elongation of the apertures 28. The rollers 44, 45, 46 are centrally positioned on the shafts 47 and their combined vertical dimensions are less than the vertical extent of the pin 48, so that upper and lower portions of the pins 48 extend above and below the rollers 44, 45, 46, with upward and downward end projections of the pins 48 fitting within reduced cross-sectional dimensioned portions 49, 50 of the apertures 28, and with the rollers 44, 45, 46 fitting within a central enlarged portion 51 (see FIG. 3).

For the embodiments shown, the outside diameter surfaces of the rollers 44, 45, 46 are vertically straight, right circular cylindrical surfaces and the simultaneously contacted cam surfaces 18, 19, 39, 40 are likewise vertically straight, sinusoidal wavelike epicycloidal curved surfaces. The outside rollers 44, 46 are advantageously made of larger outside diameter than the central roller 45, and roller dimensions in their axial directions are chosen so that each edge 39, 40 of the belt 38 will be captured within the gap 52 (FIG. 2) formed between facing surfaces of the upper and lower rollers 44, 46. A schematic representation showing relative dimensioning and positioning of drive and driven elements looking down on the left side of the drive mechanism 10 is shown in FIG. 4.

As illustrated, a specific embodiment has a cam surface 18 of flange 16 of track 14 and epicycloidic, wavelike shape comprising a multiplicity of evenly-spaced identical teeth 54 separated by a like multiplicity of evenly-spaced identical rounded recesses or pockets 55. The depicted embodiment shows surface 18 having a cyclic undulation of 10 ½(or 21) teeth in a length in which the wall 25 of car 12 has 6 (or 12) apertures 28, with an assembly 42 located within each aperture 28, its pin axis pointing out of the page. This arrangement is based on a scheduled even spacing set-up of 11 (or 22) oscillator locations; however, with an aperture 28 (i.e. roller assembly 42) positioned only at every other location. This differs from conventional "one-more" or "one-less" wave surface tooth-to-roller ratios (see Rabek and Batty discussed previously) because of the recognition that all scheduled apertures (i.e. rollers) do not need to be present. The elimination of every other roller provides for a stronger wall structure for car 12. It is noted that while the shown arrangement has eliminated every other roller assembly so that horizontal rollers 29, 30 may be located between each opposing pair of roller assemblies 42 for improved strength, other non-even eliminations could also be made.

The larger diameter rollers 44, 46 are located to contact the surface 18. The cam surface 39 is also cyclically undulated but with a much smaller frequency of, say, one-half (or one) cycle for every 10 ½(or 21) teeth 54, with teeth 56 and pockets 57 being correspondingly of much greater pitch than the teeth 54 and pockets 55 of the cam surface 18. The central, smaller diameter rollers 45 are located to contact the surface 39. It is preferred that the structure of the cam surfaces 19, 40 and associated car wall 26 apertures be mirror-images of the structure shown in FIG. 4. Although it is recognized that frequency, period and/or phase differences are possible between the left and right side components, advantageous load balancing of oppositely laterally-directed forces is obtained by utilizing identical frequencies, periods and phases. Having pairs of horizontal rollers 29, 30 located between each pair of opposed assemblies provides a more rugged car 12.

In operation, as the continuous belt 38 is drawn linearly, longitudinally of the track 14 through the car 12, the cyclic undulation perpendicular to the walls 25, 26 of the car 12 will reciprocate the respective roller assemblies 42 likewise perpendicular to the wall 25, 26 by contact with the central roller 45. This reciprocation will drive the outer rollers 45, 46 in like reciprocation against the stationary cam surfaces 18, 19 of the flanges 16, 17 of the track 14, pushing the upper and lower ends of the pins 48 against the walls of the constrictions 49, 50 of the apertures 28, thereby exerting a longitudinally directed force component on the walls 25, 26 to propel the car 12 axially, longitudinally along the track. The belt 38 will be confined above and below by the roller paths 29, 30 and along the edges by oppositely disposed pairs of rollers 45. Facing surfaces of rollers 44, 46 on oppositely-disposed pairs of roller assemblies 42 will maintain the rollers 45 at their positions adjacent the belt side edges 39, 40. The rollers 35, 36 will ride in the guide channels 21, 22. The 22:21 "one more" roller-to-teeth ratio employed (however, with every other roller removed) will drive the car 12 in the same direction as the direction in which the belt 38 is drawn. Basing the drive on a "one less" roller-to-teeth ratio would drive the car 12 in the opposite direction Transmission of the motion from the drive member 38 to the driven member 12 is advantageously achieved with the shown configurations of the roller assemblies 42 and apertures 28. The freewheeling independence of the separate elements 44, 45, 46 and 48 minimizes relative motion between the opposing cam surfaces and the structure of the intermediate carrier. The pins 48 will be kept relatively stationary, except for rolling contact during the slight lateral reciprocation, in their driving contact against the structure of the carrier 12.

Those skilled in the art to which the invention relates will appreciate that various substitutions and modifications can be made to the described embodiment without departing from the spirit and scope of the invention as described by the claims below.

What is claimed is:

1. Wave gear motion transmission apparatus, comprising:

a first cam member having a first cyclically undulated wave surface;

a second cam member having a second cyclically undulated wave surface oppositely disposed in facing relationship to said first surface, one of said first and second surfaces being movable in a direction tangential to said other surface;

a carrier including a wall disposed between said first and second surfaces, and a plurality of elongated apertures located in said wall; and a plurality of roller assemblies respectively captured in said apertures for reciprocation in directions perpendicular to said wall and to said tangential direction; the elongations of said apertures being perpendicular to said tangential direction and to said reciprocation directions; and said roller assemblies comprising shaft pins axially-aligned in parallel with said elongations, and first and second rollers mounted in axially-spaced positions for independent free rotation about said pins, and being dimensioned, configured and adapted so that said first rollers contact said first wave surface and said second rollers simultaneously contact said second wave surface, to cause said roller assemblies to reciprocate in said reciprocation directions in response to movement of said one surface in said tangential direction to drive one of said carrier and other surface in a driven direction.

2. Apparatus as in claim 1, wherein said first and second rollers have different diameters.

3. Apparatus as in claim 1, wherein said apertures are of rolling pin cross-sectional configuration having ends of reduced dimension; and said shaft pins have ends extending beyond said first and second rollers, and located within said ends of said apertures.

4. Apparatus as in claim 1, wherein said roller assemblies further comprise third rollers mounted in axially-spaced positions to said first and second rollers for independent free rotation about said pins, said third rollers being dimensioned, configured and adapted so that said third rollers contact said first wave surface simultaneously while said first rollers contact said first wave surface and said second rollers contact said second wave surface.

5. Apparatus as in claim 4, wherein said first and third rollers have facing surfaces and have larger diameters than said second rollers, said second rollers are located between said first and third rollers, and said second cam member is located between facing said surfaces of said first and third rollers.

6. Apparatus as in claim 5, wherein said apertures are of rolling pin cross-sectional configuration having ends of reduced dimension; and said shaft pins have ends extending beyond said first and third rollers, and located within said ends of said apertures.

7. Linear gear drive apparatus, comprising:

a first cam member having a first longitudinally extending, cyclically undulated wave surface;

a second cam member having a second longitudinally extending cyclically undulated wave surface oppositely disposed in parallel facing relationship to said first surface, one of said first and second surfaces being movable in a direction longitudinal to said other surface;

a carrier including a longitudinally extending wall disposed between said first and second surfaces, and a plurality of elongated apertures located in and longitudinally spaced along said wall; and a plurality of roller assemblies respectively captured in said apertures for reciprocation in lateral directions perpendicular to said wall and to said longitudinal direction; the elongations of said apertures being perpendicular to said longitudinal direction and to said reciprocation directions; and said roller assemblies comprising shaft pins axially-aligned in parallel with said elongations, and first, second and third rollers mounted in axially-spaced positions for independent free rotation about said pins, and being dimensioned, configured and adapted so that said first and third rollers contact said first wave surface and said second rollers simultaneously contact said second wave surface, to cause said roller assemblies to reciprocate in said reciprocation directions in response to movement of said one surface in said longitudinal direction to drive one of said carrier and other surface in a driven direction parallel to said longitudinal direction.

8. Apparatus as in claim 7, wherein said apertures are of rolling pin cross-sectional configuration having ends of reduced dimension; and said shaft pins have ends extending beyond said first, second and third rollers, and located within said ends of said apertures.

9. Apparatus as in claim 8, wherein said first and third rollers have facing surfaces and have larger diameters than said second rollers, said second rollers are located between said first and third rollers, and said second cam member is located between said facing surfaces of said first and third rollers.

10. Apparatus as in claim 7, wherein said first cam member is a track, said first wave surface is an inwardly-facing surface on said track, said carrier is a car member positioned for linear movement longitudinally along said track, said wall is a wall of said car, said second cam member is a lineal member that can be drawn longitudinally relative to said car, and said second wave surface is an outwardly-facing surface on said lineal member.

11. Linear gear drive apparatus, comprising:

a track having a first longitudinally extending, cyclically undulated wave surface;

a lineal member having a second longitudinally extending cyclically undulated wave surface oppositely disposed in parallel facing relationship to said first surface, said second surface being movable in a direction longitudinal to said first surface;

a car positioned for linear movement along said track, said car including a longitudinally extending wall disposed between said first and second surfaces, and a plurality of elongated apertures located in and longitudinally spaced along said wall; and a plurality of roller assemblies respectively captured in said apertures for reciprocation in lateral directions perpendicular to said wall and to said longitudinal direction; the elongations of said apertures being perpendicular to said longitudinal direction and to said reciprocation directions; and said roller assemblies comprising shaft pins axially-aligned in parallel with said elongations, and rollers mounted for free rotation about said pins, and being dimensioned, configured and adapted so that said rollers contact said first wave surface and said second wave surface simultaneously, to cause said roller assemblies to reciprocate in said reciprocation directions in response to movement of said second surface in said longitudinal direction to drive said car along said track.

12. Apparatus as in claim 11 wherein said car comprises a housing having an interior, and said lineal member comprises a lineal belt being dimensioned, configured and adapted to be drawn in said longitudinal direction through said interior of said car.

13. Apparatus as in claim 12, wherein said track has a U-shaped lateral cross-section having left and right upwardly extending sides separated by a gap which is widened in lower regions to provide left and right guide channels; and said car has other rollers mounted on said car for movement along said track within said guide channels.

14. Apparatus as in claim 12, wherein said belt has opposite flat surfaces, and said car further includes other rollers extending through said interior to respectively contact said flat surfaces to guide said belt when said belt is drawn through said interior.

15. Apparatus as in claim 11, wherein said track has a U-shaped lateral cross-section including a horizontal base portion and left and right upwardly and inwardly extending flange portions; said flange portions have dual inwardly-facing, longitudinally extending cyclically undulated wave surfaces, oppositely disposed across an open-topped gap within which said car is fitted; said car comprises a hollow shell housing having an interior and left and right, laterally-spaced vertical walls each formed with a plurality of longitudinally-spaced vertically-elongated apertures; said lineal member comprises a flat belt extending through said interior and having left and right edges, respectively formed to present dual outwardly-facing, longitudinally extending cyclically undulated wave surfaces; and said roller assemblies comprise first and second rollers mounted in axially-spaced positions for independent free rotation about said pins, and being dimensioned, configured and adapted so that said first rollers contact said inwardly-facing wave surfaces and said second rollers simultaneously contact said outwardly-facing wave surfaces.

16. Apparatus as in claim 15, wherein said roller assemblies further comprise third rollers mounted in axially-spaced position to said first and second rollers for independent free rotation about said pins, said third rollers being dimensioned, configured and adapted so that said third rollers contact said inwardly-facing surfaces simultaneously while said first rollers contact said inwardly-facing surfaces and said second rollers contact said outwardly-facing surfaces.

17. Apparatus as in claim 16, wherein said first and third rollers have facing surfaces and have larger diameters than said second rollers, said second rollers are located between said first and third rollers, and said belt is located between said facing surfaces of said first and third rollers.

18. Apparatus as in claim 17, wherein said apertures are of rolling pin cross-sectional configuration, having upper and lower ends of reduced dimension; and said shaft pins have upper and lower ends extending beyond said first, second and third rollers, and located within said upper and lower ends of said apertures.

19. Apparatus as in claim 18, wherein said gap is widened in lower regions of said track to provide left and right guide channels; and said car has fourth rollers dimensioned, configured and adapted for movement along said track within said guide channels.

20. Apparatus as in claim 19, wherein said belt has opposite flat surfaces, and said car further comprises fifth rollers extending horizontally through said interior and dimensioned, configured and adapted to respectively contact said flat surfaces to guide said belt as it is drawn through said interior.

* * * * *